United States Patent Office 3,457,777
Patented July 29, 1969

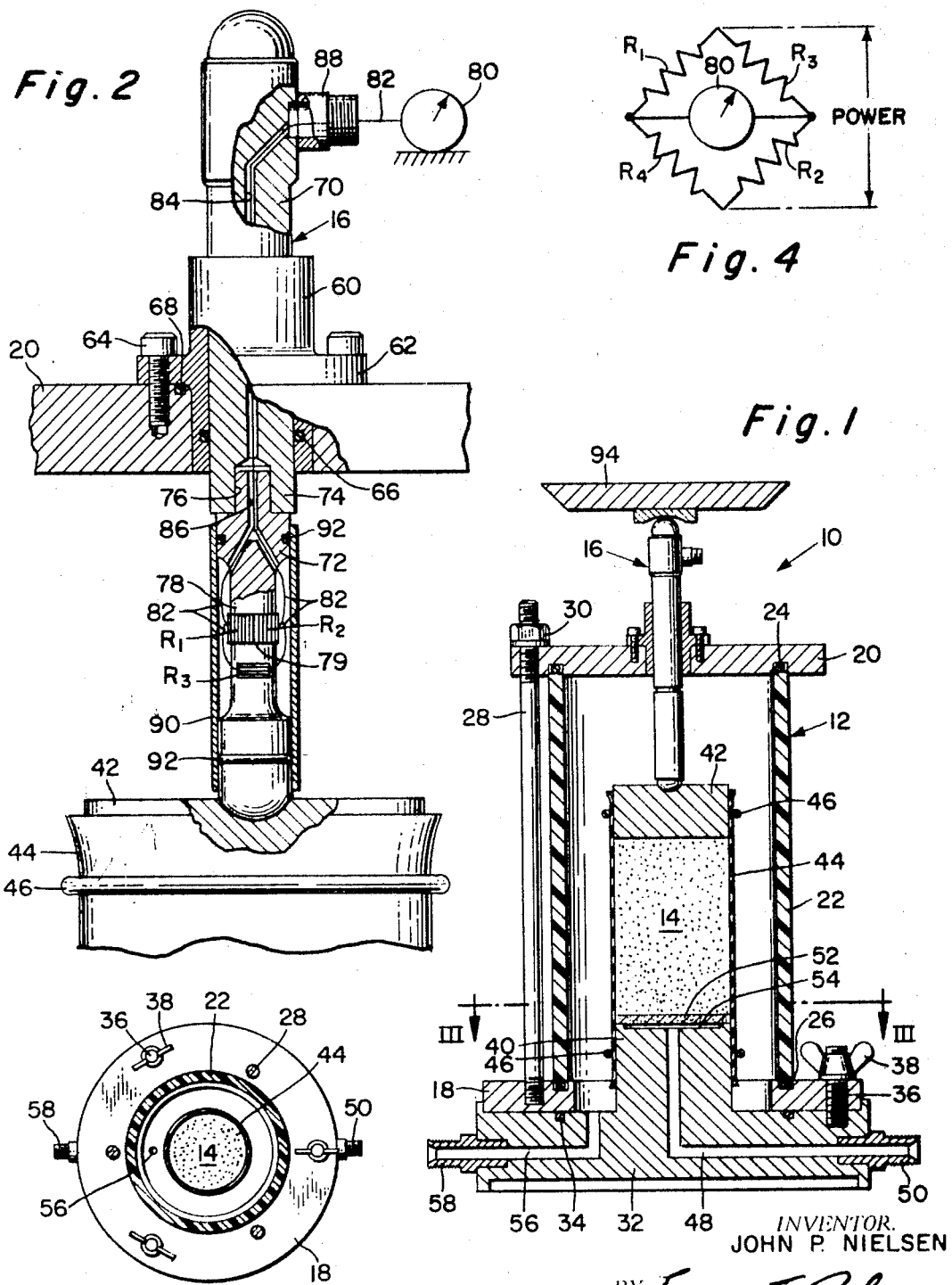

3,457,777
LOADING ROD FOR A TRIAXIAL CELL SOIL TESTER
John P. Nielsen, Oxnard, Calif., assignor to the United States of America as represented by the Secretary of the Navy
Filed Oct. 29, 1965, Ser. No. 505,770
Int. Cl. G01n *3/08*
U.S. Cl. 73—84
5 Claims

ABSTRACT OF THE DISCLOSURE

The description discloses a triaxial cell soil tester which includes a container for supporting a soil specimen and a loading rod which extends through the container and is adapted to apply a load to the soil specimen. The loading rod has a lower tip portion which has a necked down portion. A plurality of strain gauges may be connected to the tip of the loading rod at the necked down portion and a tubular shield slidably and sealably fits over the tip at the necked down portion to protect the strain gauges from a pressure environment within the container.

---

The invention described herein may be manufactured and used by or for the Government of the United States of America for governmental purposes without the payment of any royalties thereon or therefor.

The present invention relates to a loading rod for a triaxial cell soil tester and more particularly to such a loading rod which eliminates a frictional error from being introduced into an indicated load upon a soil specimen.

Stability analyses of soils used as foundation materials for engineering structures are based upon knowledge of soil stress and deformation characteristics as determined from laboratory tests. The triaxial compression test in which a cylindrical soil specimen is subjected to a constant lateral pressure within a triaxial cell is widely used to obtain such data. In this test, the soil specimen is deformed by gradually increasing axial load from a loading rod until the ultimate strength of the soil is reached. The axial load in conventional triaxial compression testing is applied by a loading rod which passes through a guide and pressure seal in the top of the triaxial cell. The guide is usually a bronze bushing, and a pressure seal is achieved by O-rings or packing. The friction between the rod and the combination of the guide and seal produces an error in the major principal stress reading since the axial load is measured outside the cell.

The present invention provides an instrumented loading rod which enables the axial load applied to the soil specimen to be determined without any error due to the friction between the rod and the top of the triaxial cell. The loading rod of the present invention extends through the top of the triaxial cell in the same manner as prior art loading rods, however the error due to friction between the loading rod and the top of the cell has been eliminated by instrumenting a lower tip portion of the rod below the top of the cell. The present invention provides a means which is operatively connected to the tip portion for sensing the strain of the tip when a load is applied to the soil specimen. The measurement of this strain will indicate the load upon the soil specimen without any error due to the frictional force between an upper stem portion of the rod and the top of the triaxial cell.

An object of the present invention is to provide a triaxial soil tester which will more accurately determine the axial load applied to a soil specimen;

Another object of the present invention is to provide a triaxial soil tester wherein the load upon a soil specimen can be determined without any error due to the frictional force between the loading rod and the top of the triaxial soil tester;

A further object is to provide a loading rod for a triaxial soil tester wherein the loading rod will enable a more accurate measurement of the axial load applied to a soil specimen;

Still another object is to provide a loading rod for a triaxial soil tester wherein the rod will enable the axial load applied to the soil specimen to be determined without any error due to frictional force between the loading rod and the top of the triaxial soil tester; and Other objects, advantages and novel features of the invention will become apparent from the following detailed description of the invention when considered in conjunction with the accompanying drawing wherein:

FIG. 1 is a vertical cross-section of the triaxial cell soil tester;

FIG. 2 is a vertical side view of the loading rod extending through the top of the triaxial cell with portions cut away to illustrate details of the invention;

FIG. 3 is a view taken along plane III—III of FIG. 1; and

FIG. 4 is a schematic of a bridge circuit which instruments the loading rod.

Referring now to the drawing wherein like reference numerals designate like or similar parts throughout the several views there is shown in FIG. 1 a triaxial cell soil tester 10 which includes a container 12, means within the container for supporting a soil specimen 14 in a substantially upright position, and a generally cylindrical loading rod 16 which extends through the top of the container and is adapted to apply a load to the top of the soil specimen. The container 12 includes a bottom annular ring 18, a cap 20 and a cylindrical tube 22 disposed therebetween. The top of the tube 22 may be sealed within the cap 20 by an O-ring 24 and in a like manner the bottom of the tube 22 may be sealed within the annular ring 18 by another O-ring 26. The cylindrical tube may be constructed of any suitable material such as Lucite or aluminum. The annular ring 18 and the cap 20 may be held in a sealed relationship with respect to the tube 22 by a series of tie rods 28, each of which are threaded at one end into the annular ring 18 and at the other end extend through the cap 20 where a nut 30 is threaded thereon for tightening purposes.

The container 12 further includes a base 32 which is connected to and seals off the bottom of the annular ring 18. The annular ring 18 may be sealed to the base 32 by an O-ring 34 and the connection may be made by a series of threaded studs 36, each of which is threaded at one end into the base 32 and at an opposite end receives a wing nut 38 for drawing the annular ring 18 in tight engagement with the base 32. The container 12 is adapted to contain a fluid which when subjected to a predetermined pressure simulates the lateral pressure of a soil environment about the soil specimen 14. The fluid may be a liquid such as an oil.

The means within the container 12 for supporting the cylindrical soil specimen 14 in a substantially upright manner may include an upstanding platform 40, which may be integral with the base 32 for supporting the bottom of the specimen 14; a top pressure block 42 which is adapted to rest on top of the soil specimen for load distributing purposes; and a resilient membrane 44 about the platform 40, the soil specimen 14 and the block 42 for incapsulating the soil specimen within the container 12. In order to ensure that the soil specimen 14 is sealed from the fluid environment within the container 12, O-rings 46 may be slipped over the platform 40 and the pressure block 42 about the membrane 44.

In order to determine the internal pore pressure of the soil specimen 14 under load passageway 48 may extend through the base 32 and the platform 40 so as to communicate the area occupied by the soil specimen 14 with the environment outside the triaxial cell 10. A fitting 50 may be connected to the base 32 at the end of the passageway 48 for the purpose of coupling a pressure indicator (not shown). A porous disc 52 may be placed on the platform 40 immediately below the soil specimen 14 and the top of the platform 40 may have grooves 54 which extend radially from the passageway 48 for the purpose of filtering and draining any undesired water from the soil specimen through the passageway 48.

In order to enable a lateral fluid pressure to be applied to the soil specimen 14 through the membrane 44 a passageway 56 may extend through the base 32 from the inside of the container 12 to the environment outside thereof. A fitting 58 may be connected to the base 32 at the outer end of the passageway 56 for the purpose of coupling to a selectively operable pressure source (not shown). It is this lateral pressure on the soil specimen 14 which simulates the pressure that would be applied to the soil specimen 14 by surrounding soil when the soil is in its natural condition in the ground.

As shown in FIG. 2 the loading rod 16 extends through the cap 20. A bushing 60 may be inserted within the cap 20 for receiving the loading rod 16 and may have an annular flange 62 which enables the bushing to be connected to the cap 20 by a series of bolts 64. In order to ensure that the chamber inside the container 12 is sealed from the outside environment an O-ring 66 may seal the bushing 60 to the loading rod 16 and another O-ring 68 may seal the bushing to cap 20.

The loading rod 16 may be divided into an upper stem portion 70 and a lower tip portion 72, the tip portion being adapted to apply the loading pressure directly on the pressure block 42. As shown in FIG. 2 it is important that the upper stem 70 extend completely through the cap 20 and that the lower tip 72 be located within the container 12. The tip 72 may be connected to the stem 70 by providing the top of the tip 72 with a necked down cylindrical projection 74 which may be force-fitted within a bore 76 at the bottom of the stem 70. While the stem 70 and the tip 72 have been described as being separable the loading rod 16 would operate for its intended purpose if these two elements were integral with respect to one another, as will become more apparent hereinafter.

As shown in FIG. 2, the tip 72 has a cylindrical shaped necked down portion 78 between its ends. Connected to the necked down portion 78 of the tip 72 are a series of strain gauges R1, R2, R3 and R4 (R4 not shown but located opposite R3). Each of these strain gauges is a resistor which will change resistance in response to any changes in the strain of the tip 72 in the area of the necked down portion 78. The strain gauges are connected in pairs about the necked down portion 78 with the strain gauges in each pair being located substantially diametrically opposite from one another. Accordingly, the pair of strain gauges R1 and R2 are located substantially opposite from one another on the necked down portion and in a like manner the pair of strain gauges R3 and R4 are located in an opposite relationship with respect to one another. The strain gauges may be connected to the necked down portion 78 by any suitable means such as bonding.

The strain gauges R1 and R2 are arranged on the tip necked down portion 78 with their resistive elements substantially parallel to the longitudinal axis of the tip. In this manner the strain gauges R1 and R2 will respond to any longitudinal strain of the tip necked down portion 78, thereby enabling the axial load applied to the soil specimen 14 to be determined. The strain gauges R3 and R4 are arranged on the tip necked down portion 78 with their resistive elements extending about the tip necked down portion 78 and longitudinal axis thereof. In this manner the strain gauges R3 and R4 will be responsive to any strain in the tip necked down portion 78 due to temperature changes.

It is desirable that any bending of the tip not introduce any error in the indicated load upon the soil specimen 14. This has been accomplished by arranging the strain gauges R1 and R2 substantially continuous about the tip necked down portion 78 and substantially diametrically opposite from one another. The strain gauges are, of course, electrically insulated from one another along their engagement at 79 and a similar location on the opposite side of the tip necked down portion 78 by the insulative covering of the strain gauges or an insulative strip bonded to the necked down portion between the strain gauges.

By appropriately arranging the strain gauges in a bridge circuit any undesired strain due to bending or temperature change will be canceled out so that a strain indicator 80 will provide a true indication of the axial load applied to the soil specimen 14. As shown in FIG. 4, this has been accomplished by connecting the pair of strain gauges R1 and R2 into opposite arms of the bridge circuit and the other pair of strain gauges R3 and R4 into the other set of opposite arms of the bridge circuit. The strain indicator 80 is connected across the pairs of strain gauges at two points of connection and a power source (not shown) is connected across the other two points of connection. Accordingly, if any bending or temperature changes occur in the tip necked down portion 78 the strain indicator 80 will indicate only the axial load applied because of the cancelling out effect of the undesired strain indications. A suitable strain indicator has been the SR4 manufactured by Baldwin Lima Hamilton. Upon calibration the reading of this indicator can be correlated with the calibration factor to determine the axial load being applied to the soil specimen 14.

A series of leads 82 connect the strain gauges R1, R2, R3 and R4 and the strain indicator 80 into the bridge circuit as shown in FIG. 4. Each lead represents two wires which extend from each strain gauge, each wire being connected to a respective end of the resistive element of the gauge. The stem 70 and the tip 72 are provided with passageways 84 and 86 respectively. The passageway 84 extends generally along the center of the stem and then out through a side thereof where a Cannon plug 88 is connected to the side of the stem 70 for coupling purposes. The passageway 86 extends generally along the center of the tip and then angles outwardly in two separate passageways, if desired, which open in the necked down area 78. The leads 82 from the strain gauges extend upwardly within the passageways 86 and 84 and out through the Cannon plug 88 where they are connected to a power source (not shown) and the strain indicator 80. The strain indicator 80 is shown in schematic and in actual practice a female coupling about the leads from the strain indicator 80 would be employed for connection to the Cannon plug 88.

Since the tip 72 is located within the container 12 it is desirable to protect the strain gauges R1, R2, R3 and R4 from the fluid pressure environment therein. This has been accomplished by providing a tubular shield 90 which is slidably and sealably fitted over the tip on opposite sides of the necked down portion 78. O-rings 92 may be provided for sealing the shield 90 to the tip 72. The shield 90 in addition to protecting the strain gauges will also prevent the tip 72 from elongating due to the pressure environment within the container 12.

In the operation of the triaxial soil tester 10 the soil specimen 14 is placed within the container 12, as shown in FIG. 1. A lateral pressure is applied to the soil specimen 14 by a pressure source (not shown) which is connected to coupling 58. A load is then applied to the soil specimen 14 by a loading yoke 94 which acts upon the top of the loading rod 16. As the loading yoke 94 increases the load upon the soil specimen 14 the friction force between the loading rod 16 and the bushing 60 will not introduce any error in the indicated load since the loading rod is instrumented with strain gauges at a location which is entirely below the cap 20 of the container 12. The strain gauges R1, R2, R3 and R4 will be responsive to only the strain of the loading rod 16 below the cap 20 of the container 12. The arrangement of the strain gauges R1, R2, R3 and R4 about the loading rod and their connection in a bridge circuit cancels out any bending moment forces which may be imposed upon the loading rod 16. The shield 90 protects the strain gauges and the necked down portion 78 of the loading rod 16 from the fluid pressure environment within the container 12. Upon calibration the strain reading at the indicator 80 can then be correlated to indicate the axial load applied to the soil specimen 14.

It is now obvious that the present invention provides a loading rod for a triaxial cell soil tester which will enable the tester to have improved accuracy. The instrumentation of the loading rod below the top of the triaxial soil tester has enabled readings to be taken of the axial load without any error due to frictional force between the loading rod and the top of the cell.

I claim:
1. In a triaxial cell soil tester including a container having a top and a bottom, means within said container for supporting a cylindrical soil specimen in a substantially upright position, said container having an opening for introducing a fluid to subject the soil specimen to a pressure, and a loading rod extending through the top of said container and adapted to apply a load to the top of said soil specimen, the improvement comprising:
   said loading rod having an upper stem portion which slidably extends completely through the container top, and a lower tip portion within said container which is adapted to apply pressure to the soil specimen;
   said tip having a necked down portion between its ends;
   sensing means operatively connected to said tip at the necked down portion for sensing strain of the tip when a load is applied to the soil specimen;
   said sensing means including at least one strain gauge and an electrical lead which is connected to the strain gauge and extends through the tip to an area outside said container; and
   a tubular shield slidably and sealably fitted over the tip across the necked down portion to protect the strain gauge from the pressure environment within said container.

2. In a triaxial cell soil tester as claimed in claim 1 wherein the sensing means includes:
   a first pair of strain gauges connected to the necked down portion of said tip diametrically opposite one another and extending substantially continuously about said tip with the resistive elements in said strain gauges extending substantially parallel with respect to the longitudinal axis of said tip;
   a second pair of strain gauges connected to the necked down portion of said tip diametrically opposite one another with the resistive elements in these gauges extending about the tip; and
   means connecting the pairs of strain gauges in a bridge circuit with the strain gauges of said first pair forming opposite arms of the bridge circuit and the strain gauges of the second pair forming the other opposite arms of the bridge circuit.

3. In a triaxial cell soil tester as claimed in claim 2 including:
   a strain indicator located outside said container;
   the connecting means extending substantially axially through the tip and stem and connected to the strain indicator; and
   said strain indicator being connected across said pairs of strain gauges.

4. A loading rod for a triaxial cell soil tester of the type including a container which has a top and a bottom and means within said container for supporting a cylindrical soil specimen in a substantially upright position, comprising:
   a loading rod having an upper stem portion which is capable of slidably extending completely through the container top, and a lower tip portion disposed wholly within said container and formed with a necked down section;
   a first pair of strain gauges connected to said tip and extending substantially continuously about said necked down section with the resistive elements in said strain gauges extending substantially parallel with respect to the longitudinal axis of said tip;
   a second pair of strain gauges connected to said tip with the resistive elements in these gauges extending about the tip;
   means connecting the pairs of strain gauges in a bridge circuit with the strain gauges of said first pair forming opposite arms of the bridge circuit and the strain gauges of the second pair forming the other opposite arms of the bridge circuit; and
   a tubular shield slidably and sealably fitted over the tip across the necked down section to protect the strain gauges from the pressure environment within said container.

5. A loading rod as claimed in claim 4 wherein:
   the connecting means extends into the tip at a location within said tubular shield, then upwardly within the tip and stem and then out of the stem where said connecting means is adapted to be connected to a strain indicator.

References Cited
UNITED STATES PATENTS

| | | | |
|---|---|---|---|
| 2,833,144 | 5/1958 | Miller et al. | 73—84 |
| 3,283,566 | 11/1966 | Fietz | 73—84 |
| 3,338,091 | 8/1967 | Tatum | 73—88.5 |

OTHER REFERENCES
New Product Bulletin No. G-132–62, Soiltest Incorporated, 4711 W. North Ave., Chicago, Ill., received in U.S. Patent Office Jan. 3, 1963; pp. 4 and 5 only.

RICHARD C. QUEISSER, Primary Examiner

C. E. SNEE III, Assistant Examiner